Jan. 4, 1966 R. D. BOND 3,226,836
FLUID-ENTRY-RESISTANT GAUGES AND METHOD
Filed April 17, 1964
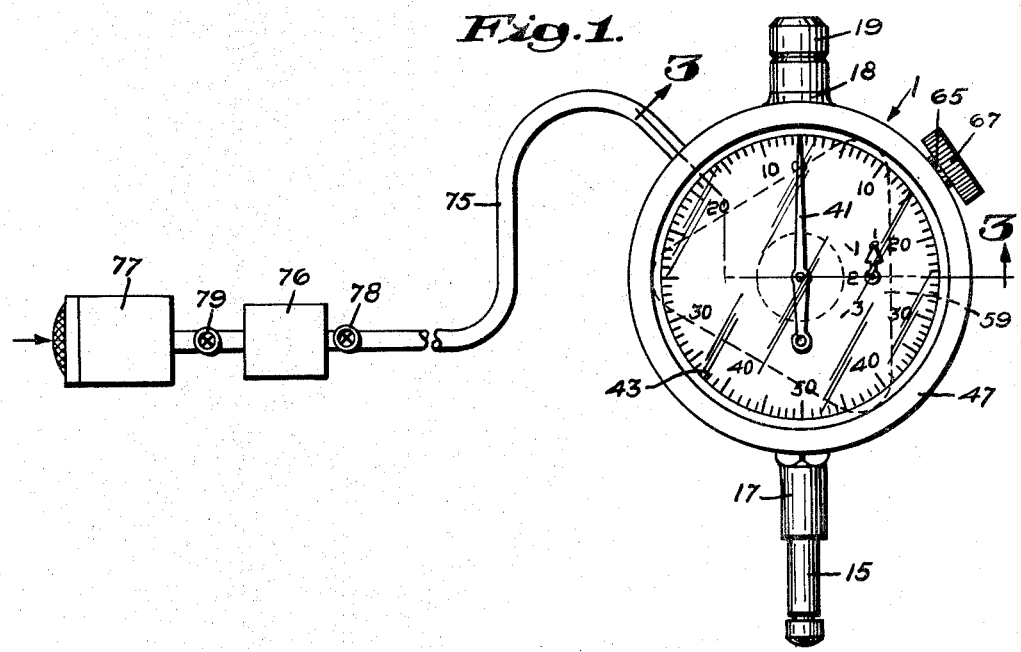
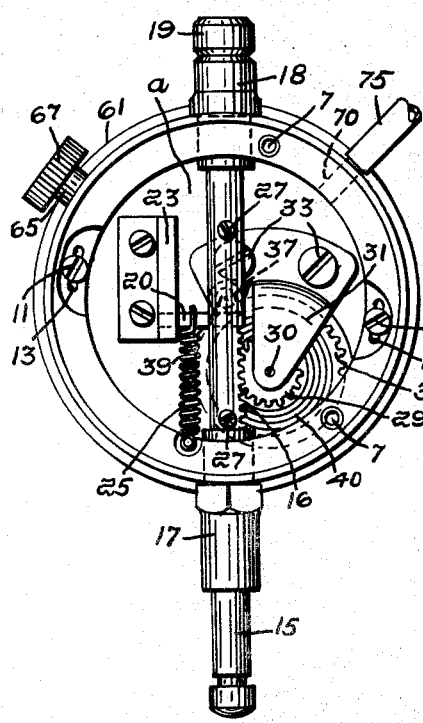
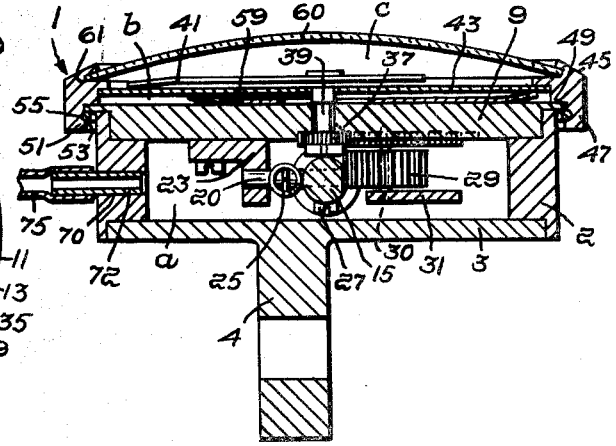
Inventor:
Robert D. Bond,
by Blair and Buckles
Attorneys

3,226,836
FLUID-ENTRY-RESISTANT GAUGES AND METHOD

Robert D. Bond, Waltham, Mass., assignor to B. C. Ames Co., Waltham, Mass., a corporation of Massachusetts
Filed Apr. 17, 1964, Ser. No. 360,549
3 Claims. (Cl. 33—172)

My present invention relates to encased measuring instruments, and more particularly dial gauges such as dial micrometer gauges, indicators, comparators, cylinder gauges and like instruments for measurement of thickness or other dimensions, spacing, relative angularity and other values such as required in the course of precision manufacture of parts and other processing operations.

As a primary objective the invention aims to provide for excluding entry of foreign fluids to the interior of the gauge case, such as steam, vapor, air at high humidity and other gaseous volumes as well as liquids as in the instance of necessary use of the gauges at submerged locations as in a tank or otherwise, whereby the gauges are made resistant to the entry of fluids of any sort and under substantially any circumstances in which the guages are subject to regular or occasional exposure to ambient or enveloping liquids or gases.

Along with such prevention of otherwise harmful effects of the excluded fluids as to the internal mechanisms of the gauges, the invention further proposes improved bearing support for moving parts of the latter with reduction of friction and wear thereon.

The particular gauge selected for illustrating one embodiment of the means of the invention and for practice of the method will be understood as merely representative of any of such dial-type gauging devices, without limitation to the exemplary structure shown aside from the novel combination and adaptation of the principles of the invention to such form of gauge as and for the purposes set forth.

In the drawing:

FIG. 1 shows a front elevation of a gauge embodying the invention and useful for the method thereof;

FIG. 2 is a rear view of the guage constructed according to FIG. 1 with the back plate removed; and FIG. 3 is a section substantially as on the line 3—3 of FIG. 1.

Referring to the drawing, a gauge is there illustrated in sufficient structural detail to afford an understanding of the invention as operatively related thereto, it again being noted that the gauge here shown is intended as exemplary of the class of encased instruments concerned.

The gauge assembly or housing as a whole is indicated at 1. It comprises a casing 2 having a back plate 3 removably secured to it as by screws threaded into tapped holes 7 in the casing, FIG. 2. The back plate may be provided with an ear 4 for mounting the gauge on some auxiliary support as at a bench or other use station, which provision on the gauge may be variously shaped or may be omitted in instances where not desired. At its opposite or forward end the casing 2 is fitted with a front plate 9 removably held on the casing as by screws 11 extending through arcuate slots 13 concentric with the casing axis and threaded into appropriately located tapped holes in the front plate 9. The latter accordingly is rotatably adjustable relative to the casing 2 which with the back and front plates 3 and 9 present the main support for the gauge mechanism.

Said casing assembly slidably supports a contact feeler 15 shown as a rod extending diametrically through the casing 2. This rod 15 is provided intermediately, within the casing 2, with rack teeth 16 and is prevented from rotation by a pin 20 rigidly secured to it and sliding in a longitudinal groove in a block 23 secured to the front plate 9. The contact feeler or rod 15 is guided adjacent one projecting end by a sleeve member or nipple 17 secured to and extending radially through the casing 2, and similarly is guided at the opposite end in a like member 18 on the casing and desirably having its outer end removably closed as by a dust cap 19. The contact feeler 15 is urged toward its position substantially as shown on the drawing by a spring 25 fixed at one end to the pin 20 and at its other end to the casing. The limit of longitudinal travel of the rod 15, diametrically of the casing, is determined as by the two stop pins 27, FIGS. 2 and 3, carried by it and cooperating with the inner wall of the casing 2.

In the example shown the rack teeth 16 of the contact feeler have meshing with them a pinion 29 the staff 30 of which at one end is journaled in a bracket 31 secured to the front plate 9 as by screws 33, the other end of the staff 30 being journaled in the front plate 9. Fixed on this staff 30 of the pinion 29 is a gear 35 which meshes with a center pinion 37. The staff 39 of the latter also is journaled in the bracket 31 and in the front plate 9. Desirably a torsion spring 40, FIG. 2, coacting with the gear 35, is provided for taking up backlash, such spring being anchored at one end to a fixed part such as the casing 2 and at its other end to the gear 35, urging the latter to rotate in one direction.

The center-pinion staff 39 carries an indicator shown in the form of a needle 41, FIGS. 1 and 3, cooperating with a graduated dial 43. In the normal operation of the gauge the dial 43 is operatively fixed with respect to the casing so that reciprocating movement of the contact feeler 15 relative to the casing will through the described gear train be indicated by movement of the needle 41 over the dial 43.

It will be observed that in the exemplary device as shown and described the front plate 9 and parts carried by it including the needle 41 and the motion transmitting means exemplified by the train of gearing connecting the rack teeth 16 to the needle are adjustable as a unit relative to the support so as to bring the pinion which cooperates with said teeth into mesh with them to a greater or less extent. In this manner proper meshing of the pinion and compensation for wear of the teeth may be had without driving of the indicator pinion by the gear 35 that meshes with the center pinion 37, since such gear moves accurately about the axial line of the indicator pinion and thus avoids difficulties in obtaining adjustment between the rack teeth 16 and pinion 29 or similar parts.

The front plate 9 in the illustrative example is of a greater diameter than the casing 2 and near its periphery has a rear portion of reduced diameter providing a relatively thin radial flange 45 projecting from the casing. The gauge housing or shell 1 as a whole comprises in addition to the casing 2 and front and back plates 9 and 3, a bezel 47 having a shoulder 49 rotatably engaging said front plate flange 45 and further has an annular lateral flange 51 surrounding the flange 45 and extending below it. The internal wall of said lateral flange 51 is formed with an annular groove 53 into which is sprung a wire-like spring member 55 encompassing the casing 2. The bezel 47 is provided with an internal flange 57 presenting a shoulder against which the margin of the dial 43 seats. Between the dial 43 and the front plate 9 is interposed also a spring plate 59 which forces the dial against said shoulder and thus causes the dial 43 to rotate with the bezel 47 when the latter is turned, the bezel being urged away from the casing causing the spring 55 to bear against the underside of the flange 45.

Hence the dial 43 may be rotated relatively to the needle 41 by rotating the bezel, for thereby setting the needle over a given dial graduation, whether the zero mark or at some other value selected for a particular use. For normally locking the bezel 47 in adjusted position relative to the casing 2 there is provided a screw stud 65 having a head 67 overlying an exterior rockably movable member 61 straddling the stud 65 with one part under the head 67 thereof. Inturning of the screw head 67 causes another portion of said member to press outwardly against the inner side of the flange 51 of the bezel thereby to lock the latter in its adjusted positions relative to the casing 2.

The gauge device or housing assembly 1 desirably further includes the conventional or other "glass," "crystal" or equivalent transparent cover 60 overlying and projecting radially beyond the dial 43 and held in place in the seating groove 61 of the bezel 47.

As earlier noted the gauge structure as illustrated and so far described is intended as exemplary of the class of such instruments, the example here selected being generally similar to the indicating gauge for measuring small variations in work dimensions and similar uses as disclosed in the W. Ames patent, 1,966,424.

It will be observed that the gauge unit 1 as shown and described comprises an overall enclosure as defined by the casing 2, back and front plates 3 and 9, the bezel 47 and the front cover 60, all together encasing the moving parts. Internally of such housing structure the mentioned main parts define a main compartment or chamber $a$ between the back and front plates 3 and 9, a lesser chamber $b$ between the front plate 9 and the dial 43 and a further space or chamber $c$ between the dial and the transparent cover 60. These chambers both severally and in the total volume are encased and closed within the precision tolerances of fine instrumental manufacture but nevertheless are neither hermetically nor hydraulically sealed either from the exterior or as between themselves. Hence heretofore such gauges have been subject to fluid leakage into them, especially when used in locations where they are normally or at various intervals in an atmosphere of dust and other entrained particles of foreign matter, or are submerged or subject to flooding from a surrounding liquid or in the presence of enveloping or ambient gases at or above the atmospheric pressure normally present internally of the gauge housing.

In accordance with the invention means is provided whereby the pressure within the gauge may be brought to and maintained at a selected level above that of the ambient external pressure and in such manner that the selected internal pressure gradient is continued during use of the gauge and functions to exclude entry of foreign matter of any sort including dust and any variety of entrained particles as well as fluids, whether liquid or gaseous, into the interior of the casing and further to cushion and reduce frictional effects between the internal moving parts of the gauge.

Accordingly and as herein illustrated the gauge housing, conveniently at the casing 2, is formed with a through aperture 70 receiving and having fixed therein a connective tubular nipple 72 having the outer end externally projecting and communicating at the inner end to the interior of the housing, in this instance directly to the main mechanism chamber $a$ to which it provides an entry port. For purposes of symmetry and balance as well as pleasing instrumental appearance such inside-outside communicating nipple 72 is shown in FIGS. 1 and 2 as located in similar angular offset relation to the diameter line of the contact member 15 as is the head 67 of the bezel locking screw. As shown such nipple 72 and the lock screw head 67 are each approximately midway along the quadrants at the respective sides of the capped end 19 of the contact rod 15. Such coupling nipple 72, itself pressure sealed into the receiving casing 2, is adapted to receive and have sealed to its outer end one end of a flexible plastic or other tubing 75 leading from a source of pressure fluid supply, which generally may be compressed air although for such purposes other gases or fluids may be employed. Such pressure fluid supply is schematically indicated in FIG. 1 as a pressure tank 76 supplied as from a compressor 77. A regulatable pressure reducing valve 78 desirably is provided in the line 75 between the supply 76 and the gauge, likewise a controlling or shut off valve 79 between the tank and the compressor.

For most purposes including total and prolonged submergence of the gauge as in a tank of liquid the pressure differential supplied to and maintained within the gauge need be of the order of but about 2 to 4 p.s.i. It may be substantially greater for special uses, within the stress limits of the particular gauge. In operation a minimal amount of leakage of the pressure fluid from the gauge occurs and is permitted, the higher internal pressure within the gauge nevertheless being maintained by the continuing supply such as illustrated. It will be understood that the pressure may be otherwise supplied in any convenient manner, as for example from a pressure flask or other available source, inasmuch as the method of the invention comprises the steps of porting the gauge housing or casing for admission of pressure fluid, providing a source of such fluid and connecting the same to the gauge housing port, conducting the pressure fluid to within the interior of the gauge, and there maintaining it at a predetermined value selected and regulated as appropriate to the particular gauging use.

It will be understood that my invention, either as to means or method, is not limited to the exemplary embodiments or steps herein illustrated or described, and I set forth its scope in my following claims.

I claim:

1. A gauge of the character described having, in combination, a closed casing operatively carrying a movable work contact and an indicator member movable over a dial, gauge mechanism in the casing including motion transmitting means connecting said contact to said indicator member, a tubular member opening at the inner end to the casing interior and extending outwardly through a wall of the casing to the exterior thereof, conduit tubing connected to said tubular member exteriorly of the casing and having means for connection to a pressure fluid supply, said latter means including provision for pressure regulation whereby to effect admission thereof to the gauge casing so as to raise the interior volume thereof to and maintain it at a selected pressure value higher than that externally ambient to the gauge casing to an extent such as typified by compressed air when supplied to said tubular member in the range of about 2 to 4 p.s.i. and thereby impeding entry of foreign matter to the casing and cushioning and frictionally relieving said gauge mechanism therein.

2. A gauge of the character described having, in combination, a closed casing operatively carrying a movable work contact and an indicator member movable over a dial, motion transmitting means in the casing connecting said contact to said indicator member, a tubular member opening at the inner end to the casing interior and extending outwardly therefrom to the casing exterior, conduit means connected at one end to said tubular member exteriorly of the casing, a compressed air container and supply means therefor, the container having an outlet together with pressure-regulating means admitting to the other end of said conduit means for supplying air-pressure therethrough to the gauge casing so as to raise the interior volume thereof to and to maintain it at a selected pressure value higher than that externally ambient to the gauge casing to an extent for thereby impeding entry of foreign matter to the casing and at the same time cushioning and frictionally relieving said motion transmitting means therein.

3. The method of measuring dimensional, angular and other physical values by the use of dial gauges which comprises encasing the dial gauge mechanism in closed nonhermetically sealed manner, porting the gauge casing for communication between the exterior and the interior, providing an external supply of pressure fluid, conducting such fluid and admitting it to the gauge casing interior via such porting, and so regulating the pressure fluid admission as to establish and to maintain a pressure status for the gauge casing interior higher than that externally surrounding the casing and thereby opposing entry of ambient fluid, dust and foreign matter to the gauge casing while at the same time thereby cushioning and frictionally relieving movable gauge mechanism therein.

References Cited by the Examiner
UNITED STATES PATENTS

| | | | |
|---|---|---|---|
| 1,966,424 | 7/1934 | Ames | 33—172 |
| 2,274,396 | 2/1942 | Barry | 73—431 |
| 2,484,685 | 10/1949 | Burdick | 98—33 |

ISAAC LISANN, *Primary Examiner.*